United States Patent
Ikeo et al.

(10) Patent No.: US 7,695,536 B2
(45) Date of Patent: *Apr. 13, 2010

(54) FUEL GAS MANUFACTURING APPARATUS

(75) Inventors: Mitsuru Ikeo, Utsunomiya (JP); Satoshi Hanai, Haga-gun (JP); Jun Machida, Saitama (JP); Hideaki Sumi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 705 days.

This patent is subject to a terminal disclaimer.

(21) Appl. No.: 11/065,210

(22) Filed: Feb. 23, 2005

(65) Prior Publication Data

US 2005/0183335 A1 Aug. 25, 2005

(30) Foreign Application Priority Data

Feb. 23, 2004 (JP) ............................. 2004-046589

(51) Int. Cl.
*C10J 3/84* (2006.01)
*B01J 7/00* (2006.01)
*F02M 23/00* (2006.01)
*B01J 8/04* (2006.01)
*C01B 3/02* (2006.01)

(52) U.S. Cl. ............................... 48/128; 48/3 R; 48/61; 48/180.1; 48/189.3; 431/4; 431/11; 431/12; 431/19; 431/354; 431/344; 431/345; 422/188; 422/193; 423/648.1

(58) Field of Classification Search .................. 48/128, 48/61, 3 R, 180.1, 189.3; 422/193, 188; 423/648.1; 429/120; 431/12, 19, 11, 4, 354, 431/344, 345
See application file for complete search history.

(56) References Cited

U.S. PATENT DOCUMENTS

| 4,131,086 A * | 12/1978 | Noguchi et al. ................. 123/3 |
| 4,497,304 A * | 2/1985 | Wintrell et al. ............. 123/527 |
| 5,137,547 A * | 8/1992 | Chretien ......................... 95/55 |
| 5,971,026 A * | 10/1999 | Beran .......................... 137/888 |
| 2003/0154720 A1* | 8/2003 | Boehnlein et al. ............. 60/767 |
| 2005/0229491 A1* | 10/2005 | Loffler ...................... 48/198.7 |

FOREIGN PATENT DOCUMENTS

| JP | 63-021760 | 1/1988 |
| JP | 8-329967 | 12/1996 |
| JP | 10-308230 | 11/1998 |
| JP | 2002-201478 | 7/2002 |
| JP | 2002-293504 | 10/2002 |
| JP | 2005-041732 | 2/2005 |

OTHER PUBLICATIONS

Japanese Office Action for Application No. 2004-046589, dated Jul. 10, 2007.

* cited by examiner

*Primary Examiner*—Glenn A Caldarola
*Assistant Examiner*—Vishal Vasisth
(74) *Attorney, Agent, or Firm*—Lahive & Cockfield, LLP; Anthony A. Laurentano (57) ABSTRACT

A home fuel gas refining system has a modifier for modifying a hydrogen-containing fuel to produce a modified gas. The modifier includes a hydrogen-containing fuel supply mechanism for supplying the hydrogen-containing fuel and a modifying air supply mechanism for supplying modifying air. The hydrogen-containing fuel delivered from the hydrogen-containing fuel supply mechanism and the modifying air delivered from the modifying air supply mechanism are mixed with each other by a modification fuel ejector, and then delivered to a reactor.

6 Claims, 8 Drawing Sheets

FUEL GAS MANUFACTURING APPARATUS

BACKGROUND OF THE INVENTION

1. Field of the Invention

The present invention relates to a fuel gas manufacturing apparatus having a modifier for modifying a hydrogen-containing fuel which contains hydrocarbon, alcohol, or the like to produce a modified gas.

2. Description of the Related Art

There has been employed in the art a hydrogen manufacturing apparatus (fuel gas manufacturing apparatus) for modifying a hydrocarbon fuel such as natural gas or the like or a hydrogen-containing fuel containing alcohol such as methanol or the like to produce a hydrogen-containing gas (modified gas) and supplying the hydrogen-containing gas as a fuel gas to a fuel cell or the like.

Such a hydrogen manufacturing apparatus basically operates to modify a hydrocarbon fuel such as an LPG (liquefied petroleum gas), a city gas, or the like with water vapor to produce a hydrogen-containing gas as a high-concentration hydrogen-rich gas, and separate high-purity hydrogen from the hydrogen-containing gas with a PSA (Pressure Swing Adsorption) device according to pressure adsorption.

Figure 8:
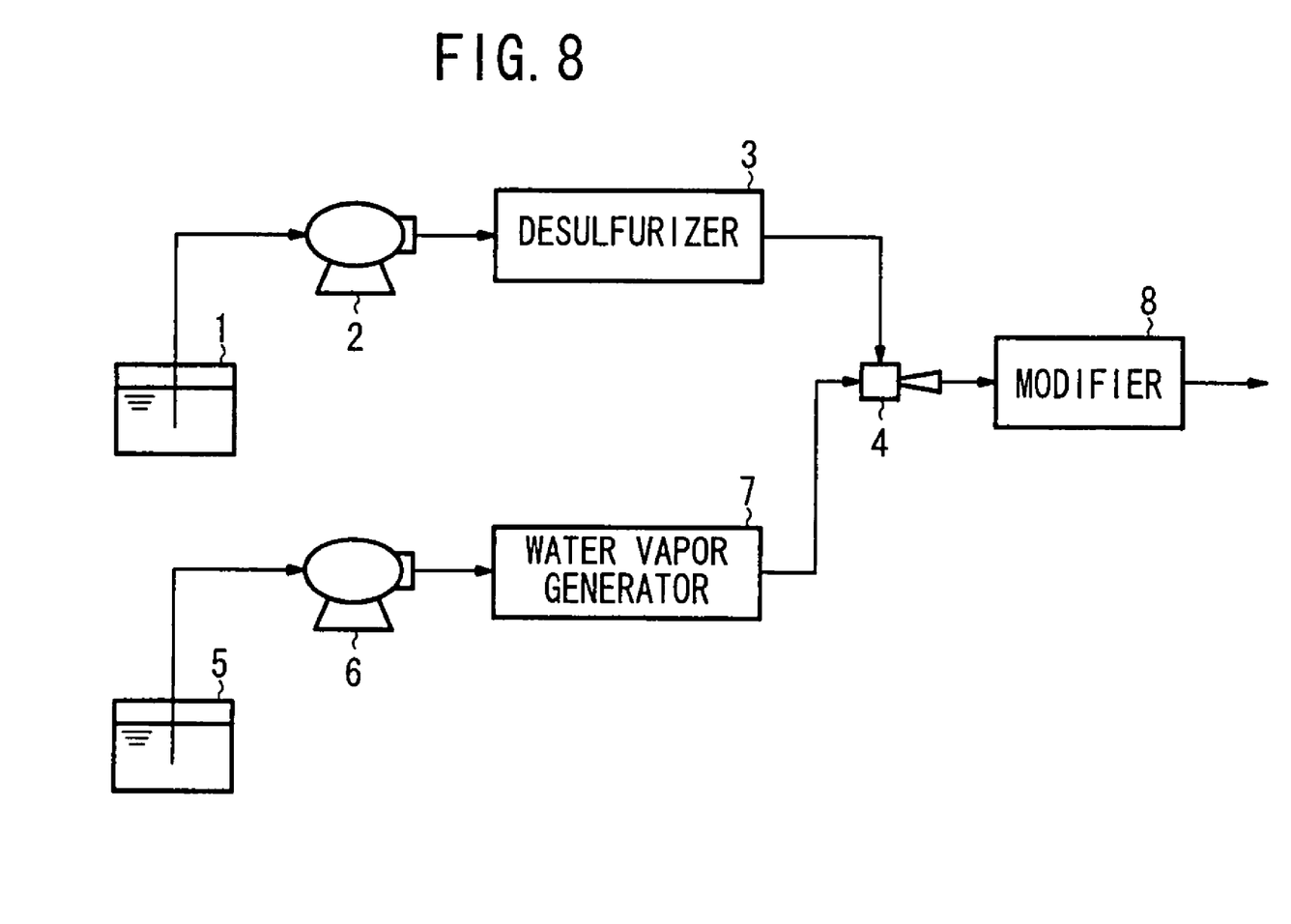
FIG. 8 is a block diagram of a system for carrying out a conventional method of manufacturing hydrogen.

For example, Japanese Laid-Open Patent Publication No. 2002-201478 discloses a method of manufacturing hydrogen by mixing desulfurized kerosene and water vapor to vaporize the kerosene, and modifying the mixture of the vaporized kerosene and water vapor. According to the disclosed method, as shown in FIG. 8 of the accompanying drawings, kerosene stored in a kerosene tank 1 is delivered by a kerosene pump 2 to a desulfurizer 3. The kerosene is desulfurized by the desulfurizer 3 and then delivered as an ejector 4 which serves as a vaporizer. Water stored in a water tank 5 is delivered by a water pump 6 to a water vapor generator 7, which converts the water into water vapor that is delivered to the ejector 4.

The ejector 4 mixes the desulfurized kerosene with the water vapor to vaporize the kerosene, and delivers the mixture to a modifier 8. The modifier 8 modifies the mixture to extract hydrogen therefrom. The hydrogen is then delivered from the modifier 8 as fuel cell hydrogen to a fuel cell system (not shown).

In the conventional system shown in FIG. 8, the dedicated kerosene pump 2 is connected to the kerosene tank 1, and the dedicated water pump 6 is connected to the water tank 5. Therefore, the overall system is large in size and is not economical.

SUMMARY OF THE INVENTION

It is a principal object of the present invention to provide a fuel gas manufacturing apparatus which is of a simple and compact arrangement capable of efficiently modifying a hydrogen-containing fuel.

According to the present invention, there is provided an apparatus for manufacturing a fuel gas, the apparatus having a modifier for modifying a hydrogen-containing fuel to produce a modified gas. The modifier includes a modifying unit for modifying the hydrogen-containing fuel, a hydrogen-containing fuel supply mechanism for supplying the hydrogen-containing fuel and a modifying air supply mechanism for supplying modifying air, and an ejector for mixing the hydrogen-containing fuel delivered from the hydrogen-containing fuel supply mechanism and the modifying air delivered from the modifying air supply mechanism into a mixture, and supplying the mixture to the modifying unit.

Since the hydrogen-containing fuel and the modifying air are mixed with each other by the ejector and then supplied to the modifying unit, the hydrogen-containing fuel can be drawn under the pressure at which the modifying air is supplied. The hydrogen-containing fuel supply mechanism requires no dedicated pump. The apparatus for manufacturing a fuel gas may thus be reduced in size with ease, and may be manufactured economically.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
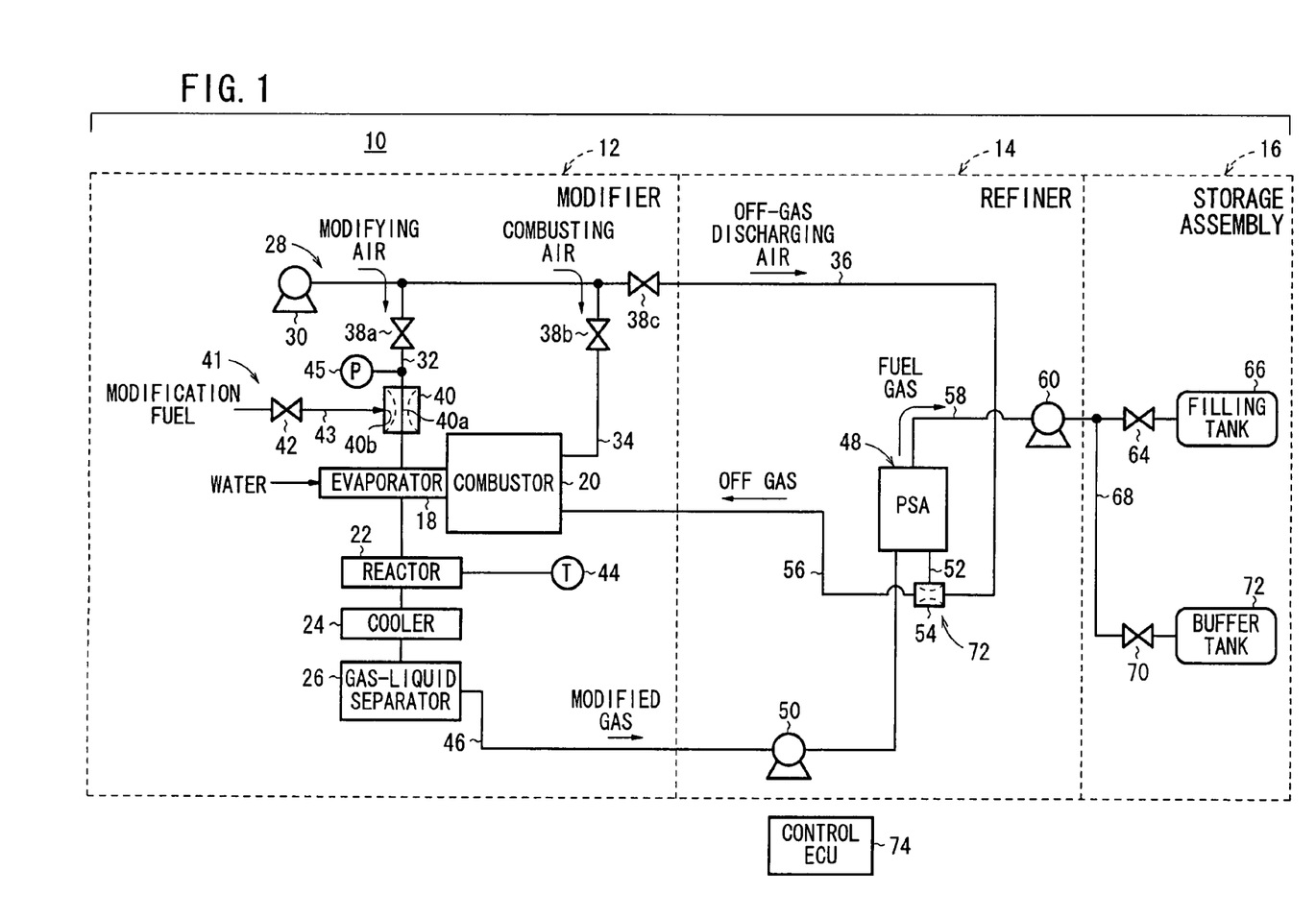
FIG. 1 is a block diagram of a home fuel gas refining system as a fuel gas manufacturing apparatus according to a first embodiment of the present invention.

FIG. 1 shows in block form a home fuel gas refining system (fuel gas refining system for household use) 10 as a fuel gas manufacturing apparatus according to a first embodiment of the present invention.

As shown in FIG. 1, the home fuel gas refining system 10 has a modifier 12 for modifying a hydrogen-containing fuel, e.g., a hydrocarbon fuel such as methane, propane, or the like (hereinafter referred to as "modification fuel") to produce a hydrogen-rich gas (hereinafter referred to as "modified gas"), a refiner 14 for refining the hydrogen-rich gas into a high-purity hydrogen gas (hereinafter referred to as "fuel gas"), and a storage assembly 16 for storing the fuel gas.

The modifier 12 has an evaporator 18 for evaporating the modification fuel. The evaporator 18 is combined with a combustor (heater) 20 such as a burner or the like. A reactor 22 (modifying unit) for modifying the modification fuel into the modified gas is disposed downstream of the evaporator 18. A cooler 24 for cooling the modified gas is disposed downstream of the reactor 22. A gas-liquid separator 26 for separating the cooled modified gas into a gaseous component and a water component is disposed downstream of the cooler 24.

The modifier 12 includes an air supply mechanism 28 having an air compressor 30 which is connected to a modifying-air supply passage 32, a combusting-air supply passage 34, and an off-gas discharging air supply passage 36. The modifying-air supply passage 32 is connected to the evaporator 18. The combusting-air supply passage 34 is connected to the combustor 20. The off-gas discharging air supply passage 36 is connected to the combustor 20 through a PSA mechanism 48 described later.

The modifying-air supply passage 32, the combusting-air supply passage 34, and the off-gas discharging air supply passage 36 can be connected to the air compressor 30 respectively through valves 38a, 38b, 38c. A modification fuel ejector 40 is disposed between the valve 38a and the evaporator 18.

The modification fuel ejector 40 is connected to a hydrogen-containing fuel supply mechanism 41. The hydrogen-containing fuel supply mechanism 41 has a hydrogen-containing fuel supply passage 43 that is connected through an atmospheric pressure regulating valve 42 to a suction port of the modification fuel ejector 40. The modification fuel ejector 40 has a main passageway 40a for ejecting modifying air from a nozzle and an auxiliary passageway 40b for drawing the modification fuel with the ejected modifying air.

A temperature sensor 44 for detecting the temperature of a modifying catalyst in the reactor 22 is connected to the reactor 22. A pressure meter 45 is connected to the modifying-air supply passage 32 upstream of the modification fuel ejector 40.

The PSA mechanism 48 of the refiner 14 is disposed downstream of and connected to the gas-liquid separator 26 through a modified gas supply passage 46. The PSA mechanism 48 is supplied with a modified gas from which water is separated by the gas-liquid separator 26. A compressor 50 is connected to the modified gas supply passage 46 for delivering the modified gas under pressure to the PSA mechanism 48.

The PSA mechanism 48 has a plurality of, e.g., three, adsorption towers (not shown) filled with an adsorbent for selectively adsorbing components other than hydrogen under a high pressure and desorbing the components under a reduced pressure. Each of the adsorption towers is cyclically operable in adsorption, depressurization, pressure uniformization, blowing-down, and purging processes for extracting high-purity hydrogen and discharging the other components or unwanted materials as an off gas into an off-gas discharge passage 52.

The off-gas discharge passage 52 is connected to an off-gas ejector 54. The off-gas ejector 54 has an end connected to the off-gas discharging air supply passage 36 and an opposite end connected to an off-gas passage 56. The off-gas ejector 54 has a function to draw an off gas from the PSA mechanism 48 with off-gas discharging air (compressed air) that is caused by the air compressor 30 to flow from the off-gas discharging air supply passage 36 into the off-gas passage 56.

The PSA mechanism 48 is held in fluid communication with a fuel gas passage 58 for discharging high-purity hydrogen from each of the adsorption towers. The fuel gas passage 58 is connected to a compressor 60. The fuel gas passage 58 has an end connected through a valve 64 to a filling tank 66 of the storage assembly 16. The fuel gas passage 58 is branched into a fuel gas branch passage 68 connected to a buffer tank 72 by a valve 70 of the storage assembly 16.

The filling tank 66 supplies a fuel gas to a fuel cell vehicle (not shown). The buffer tank 72 supplies a fuel gas stored therein to a stationary fuel cell (not shown) installed in households for generating electric energy.

The home fuel gas refining system 10 has a control ECU (Electronic Control unit) 74 as a controller for communicating with various accessory units and controlling various components of the home fuel gas refining system 10.

Operation of the home fuel gas refining system 10 thus constructed will be described below.

In the home fuel gas refining system 10, the air compressor 30 is operated by the control ECU 74 to deliver modifying air, combusting air, and off-gas discharging air respectively to the modifying-air supply passage 32, the combusting-air supply passage 34, and the off-gas discharging air supply passage 36.

The modifying air that is delivered to the modifying-air supply passage 32 is supplied to the evaporator 18, which is also supplied with a modification fuel such as a natural gas, a city gas, or the like and water. The combustor 20 is supplied with the combusting air, an off gas, and, if necessary, hydrogen, and a burning process is carried out, enabling the evaporator 18 to evaporate the modification fuel and water.

The evaporated modification fuel is sent from the evaporator 18 to the reactor 22. The reactor 22 simultaneously performs an oxidizing reaction represented by $CH_4 + 2O_2 \rightarrow CO_2 + 2H_2O$ (exothermic reaction) and a fuel modifying reaction represented by $CH_4 + 2H_2O \rightarrow CO_2 + 4H_2$ (endothermic reaction) on methane, for example, in the modification fuel, oxygen in the air, and water vapor (automatic thermal process).

The modified gas that is produced by the reactor 22 is cooled by the cooler 24 and then supplied to the gas-liquid separator 26, which separates water from the modified gas. The modified gas is then sent from the gas-liquid separator 26 to the modified gas supply passage 46. The modified gas is compressed by the compressor 50 and supplied to the PSA mechanism 48.

In the PSA mechanism 48, each of the adsorption towers adsorbs components other than hydrogen, producing a fuel gas containing high-concentration hydrogen (hydrogen-rich). The fuel gas is supplied from the PSA mechanism 48 to the fuel gas passage 58. The fuel gas is then selectively stored in the filling tank 66 and the buffer tank 72 by the compressor 60.

An off gas (residual gas) from each of the adsorption towers is discharged into the off-gas discharge passage 52. The off-gas discharge passage 52 is connected through the off-gas ejector 54 to the off-gas passage 56. Therefore, the off gas that is discharged into the off-gas discharge passage 52 is delivered to the combustor 20 by the off-gas discharging air (compressed air) that is supplied from the off-gas discharging air supply passage 36 to the off-gas ejector 54. The off gas is used as a combustion fuel by the combustor 20.

According to the first embodiment, the temperature of the catalyst in the reactor 22 is detected by the temperature sensor 44 combined with the reactor 22, and the temperature sensor 44 supplies a detected signal to the control ECU 74. Based on the detected temperature of the catalyst, the control ECU 74 controls the opening of the valve 38a connected to the modifying-air supply passage 32, thereby regulating the pressure P1 of the modifying air that is supplied to the modifying-air supply passage 32.

Figure 2:
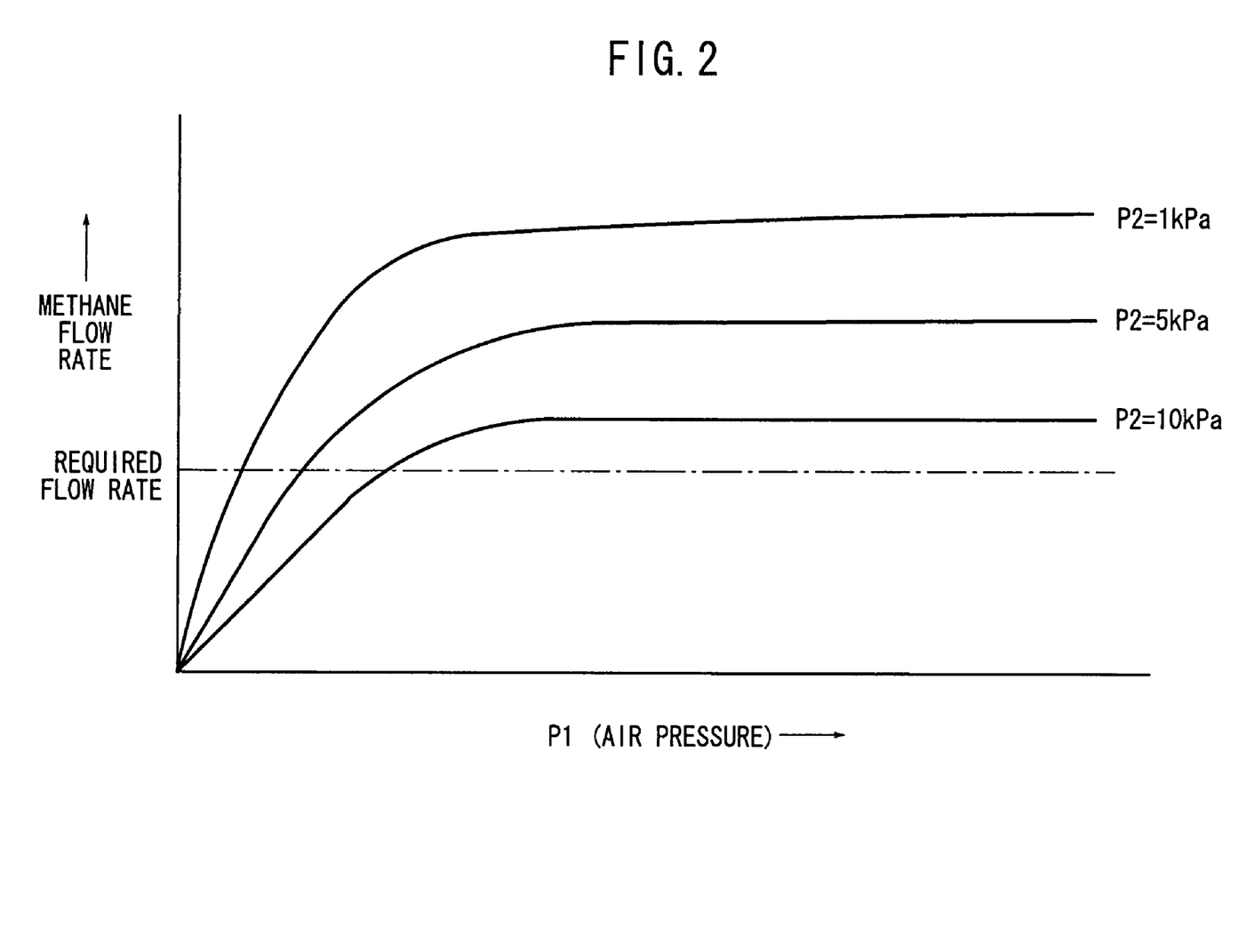
FIG. 2 is a diagram illustrative of characteristics of a modifying-fuel ejector in the home fuel gas refining system shown in FIG. 1.

The modification fuel ejector 40 draws the modification fuel from the hydrogen-containing fuel supply mechanism 41 with the pressure-regulated modifying air, thereby controlling the flow rate of the modification fuel. Though the flow rate of the modification fuel that is drawn by the modification fuel ejector 40 varies as the internal pressure P2 of the reactor 22, as shown in FIG. 2, the modification fuel can be kept at a required flow rate by setting the pressure of the modifying air that is introduced into the main passageway 40a of the modification fuel ejector 40.

According to the first embodiment, as described above, the modifier 12 has the modification fuel ejector 40, and the modifying air is injected into the main passageway 40a of the modification fuel ejector 40 to draw the modification fuel at a desired flow rate. Consequently, the hydrogen-containing fuel supply mechanism 41 needs no dedicated pump, and hence may be reduced in size and simplified in structure.

Particularly, if a city gas is used as the modification fuel, no pressure booster pump is required. Therefore, the modifier 12 is rendered compact and economical.

Figure 3:
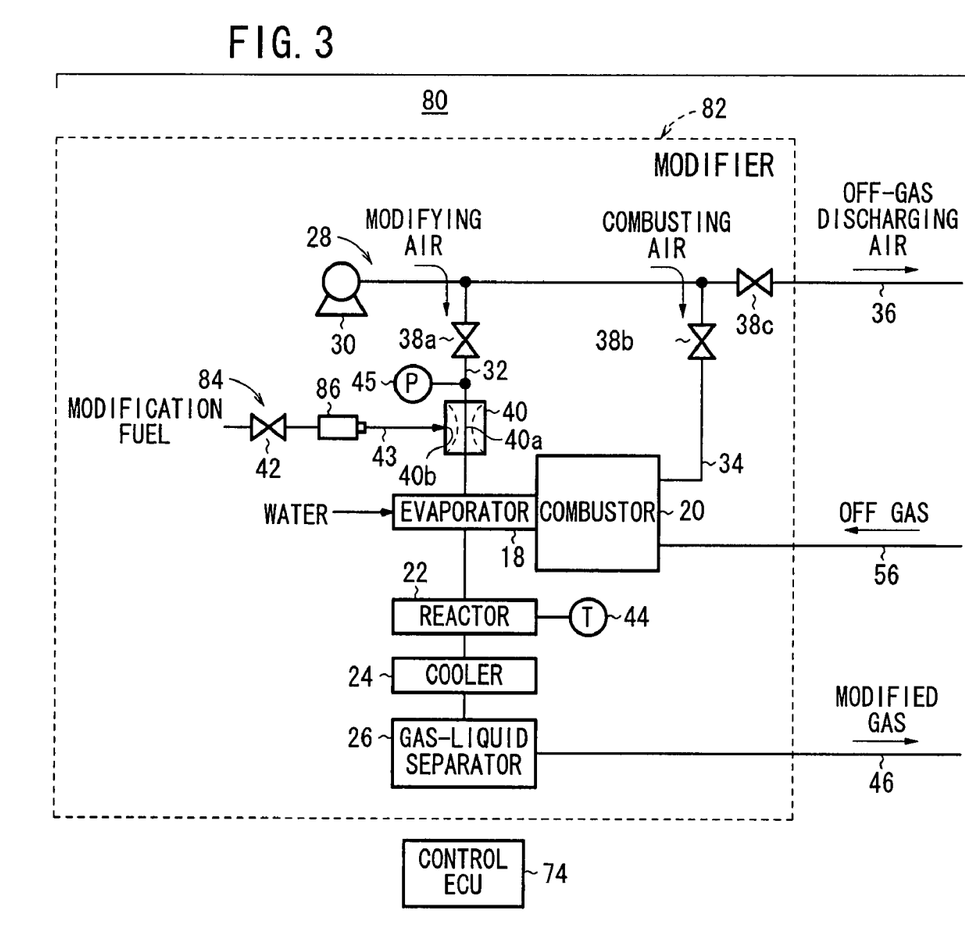
FIG. 3 is a block diagram of a modifier in a home fuel gas refining system as a fuel gas manufacturing apparatus according to a second embodiment of the present invention.

FIG. 3 shows in block form a modifier 82 in a home fuel gas refining system 80 as a fuel gas manufacturing apparatus according to a second embodiment of the present invention. Those parts of the modifier 82 which are identical to those of the modifier 12 in the home fuel gas refining system 10 according to the first embodiment are denoted by identical reference characters, and will not be described in detail below. The same practice also applies to third and fourth embodiments, to be described later, of the present invention.

As shown in FIG. 3, the modifier 82 has a hydrogen-containing fuel supply mechanism 84 including an injector 86 disposed in the hydrogen-containing fuel supply passage 43. The control ECU 74 controls a coil energization time of the injector 86 based on a map (not shown) depending on detected pressures from the pressure meter 45.

According to the second embodiment, the pressure of the modifying air upstream of the modification fuel ejector 40 is detected by the pressure meter 45 and sent to the control ECU 74. Based on the detected pressure, the control ECU 74 searches the map and controls the period of time in which the coil (not shown) of the injector 86 according to data retrieved from the map.

Figure 4:
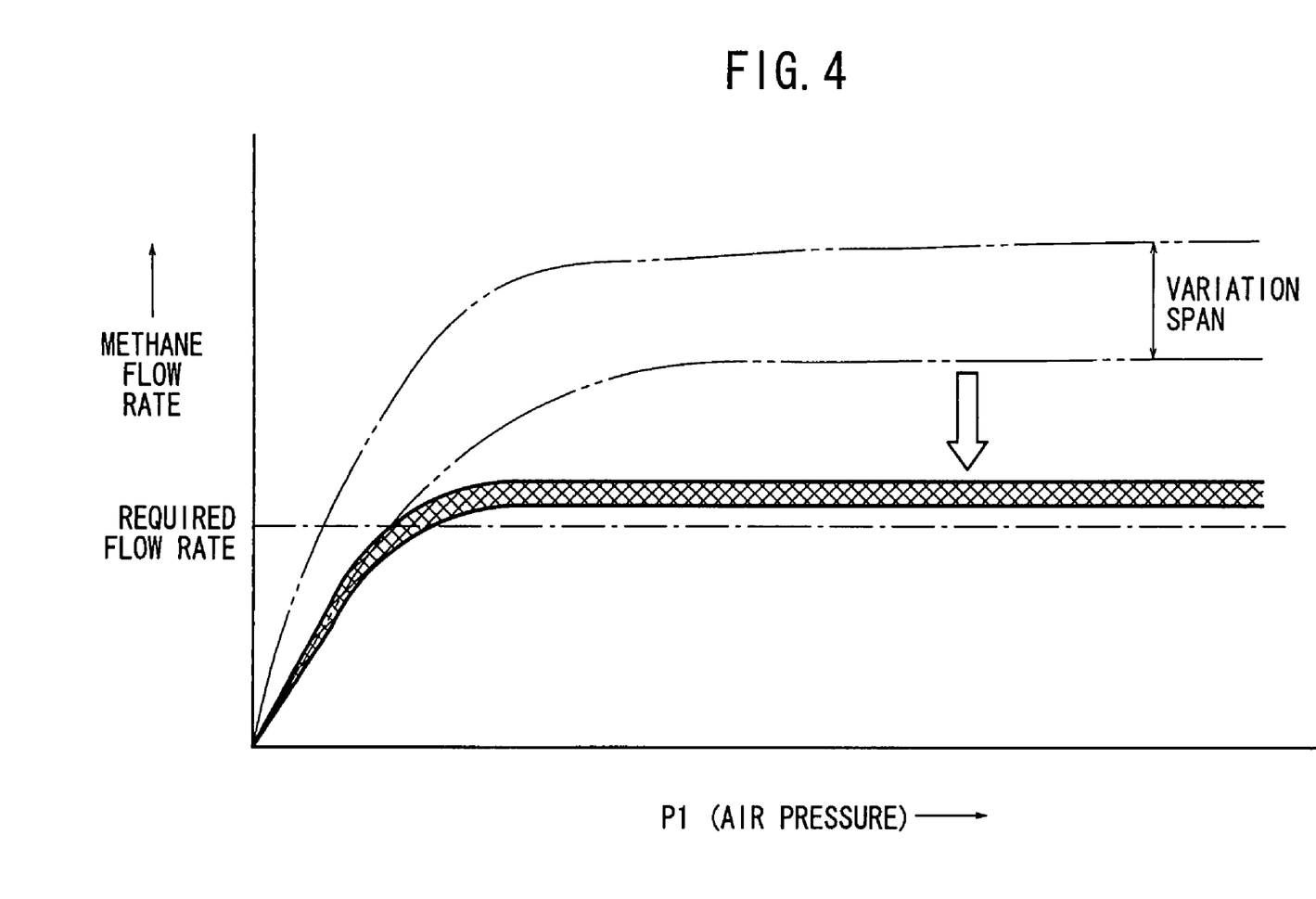
FIG. 4 is a diagram illustrative of a flow rate of a modifying fuel with a combination of a modifying-fuel ejector and an injector.

The injector 86 functions as a variable resistor of the hydrogen-containing fuel supply passage 43 to adjust the flow rate of the modification fuel that is drawn by the modification fuel ejector 40. As shown in FIG. 4, the flow rate of the modification fuel that is drawn by the modification fuel ejector 40 is prevented from varying due to pressure fluctuations downstream of the modification fuel ejector 40. The flow rate of the modification fuel can thus be adjusted highly accurately to a desired flow rate level.

Figure 5:
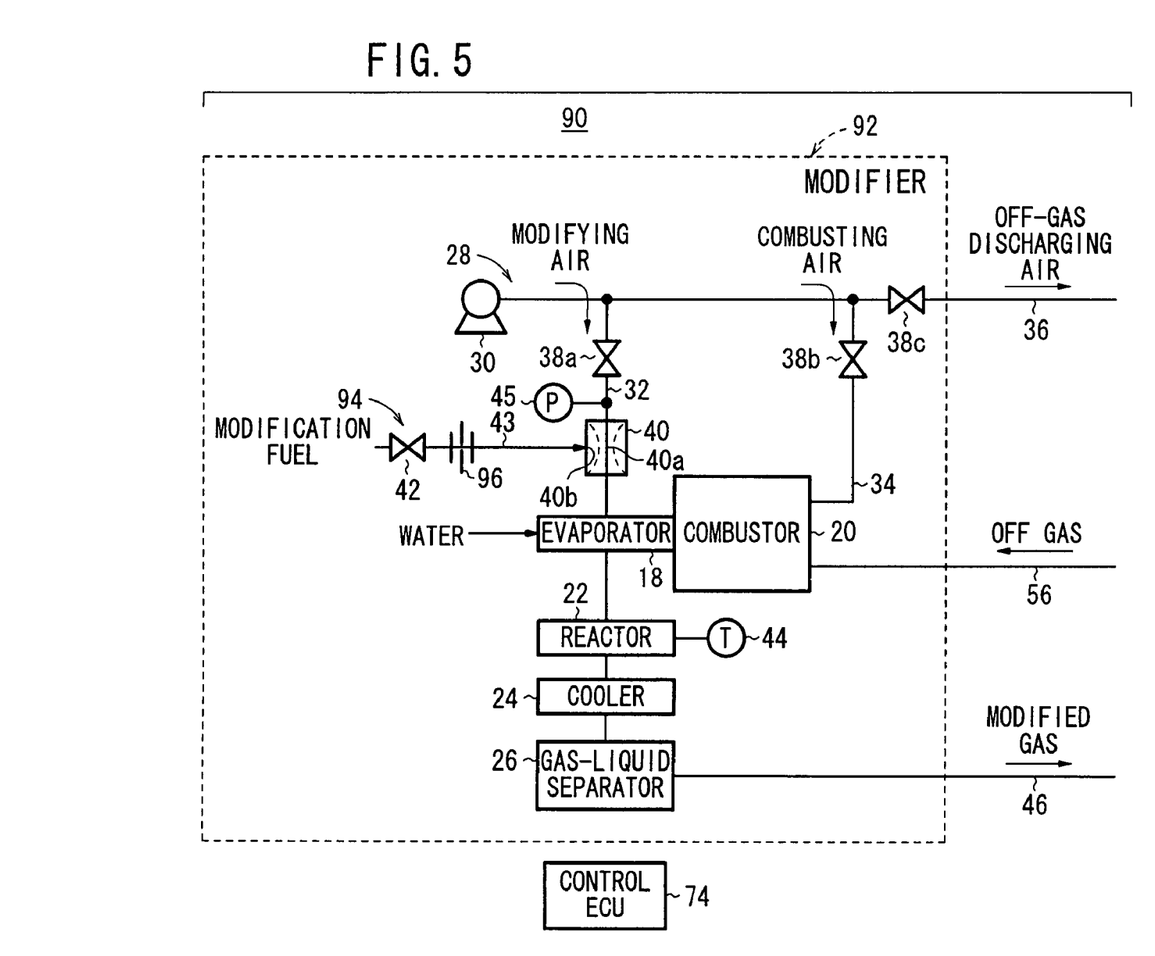
FIG. 5 is a block diagram of a modifier in a home fuel gas refining system as a fuel gas manufacturing apparatus according to a third embodiment of the present invention.

FIG. 5 shows in block form a modifier 92 in a home fuel gas refining system 90 as a fuel gas manufacturing apparatus according to a third embodiment of the present invention.

As shown in FIG. 5, the modifier 92 has a hydrogen-containing fuel supply mechanism 94 including an orifice 96 disposed in the hydrogen-containing fuel supply passage 43. According to the third embodiment, the orifice 96 functions as a fixed resistor of the hydrogen-containing fuel supply passage 43 to adjust the flow rate of the modification fuel that is drawn by the modification fuel ejector 40. With the orifice 96, the flow rate of the modification fuel that is drawn by the modification fuel ejector 40 is prevented from varying, and can be adjusted highly accurately to a desired flow rate level.

Figure 6:
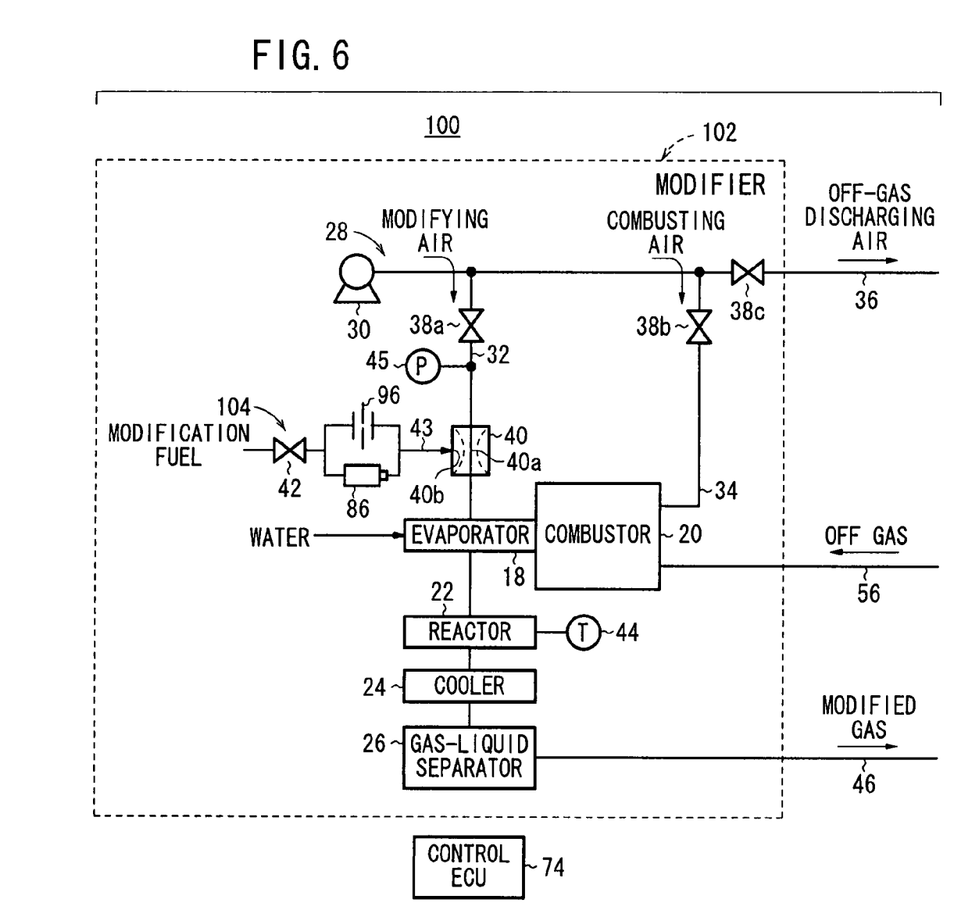
FIG. 6 is a block diagram of a modifier in a home fuel gas refining system as a fuel gas manufacturing apparatus according to a fourth embodiment of the present invention.

FIG. 6 shows in block form a modifier 102 in a home fuel gas refining system 100 as a fuel gas manufacturing apparatus according to a fourth embodiment of the present invention.

As shown in FIG. 6, the modifier 102 has a hydrogen-containing fuel supply mechanism 104 including an injector 86 and an orifice 96 that are disposed parallel to each other in the hydrogen-containing fuel supply passage 43.

Figure 7:
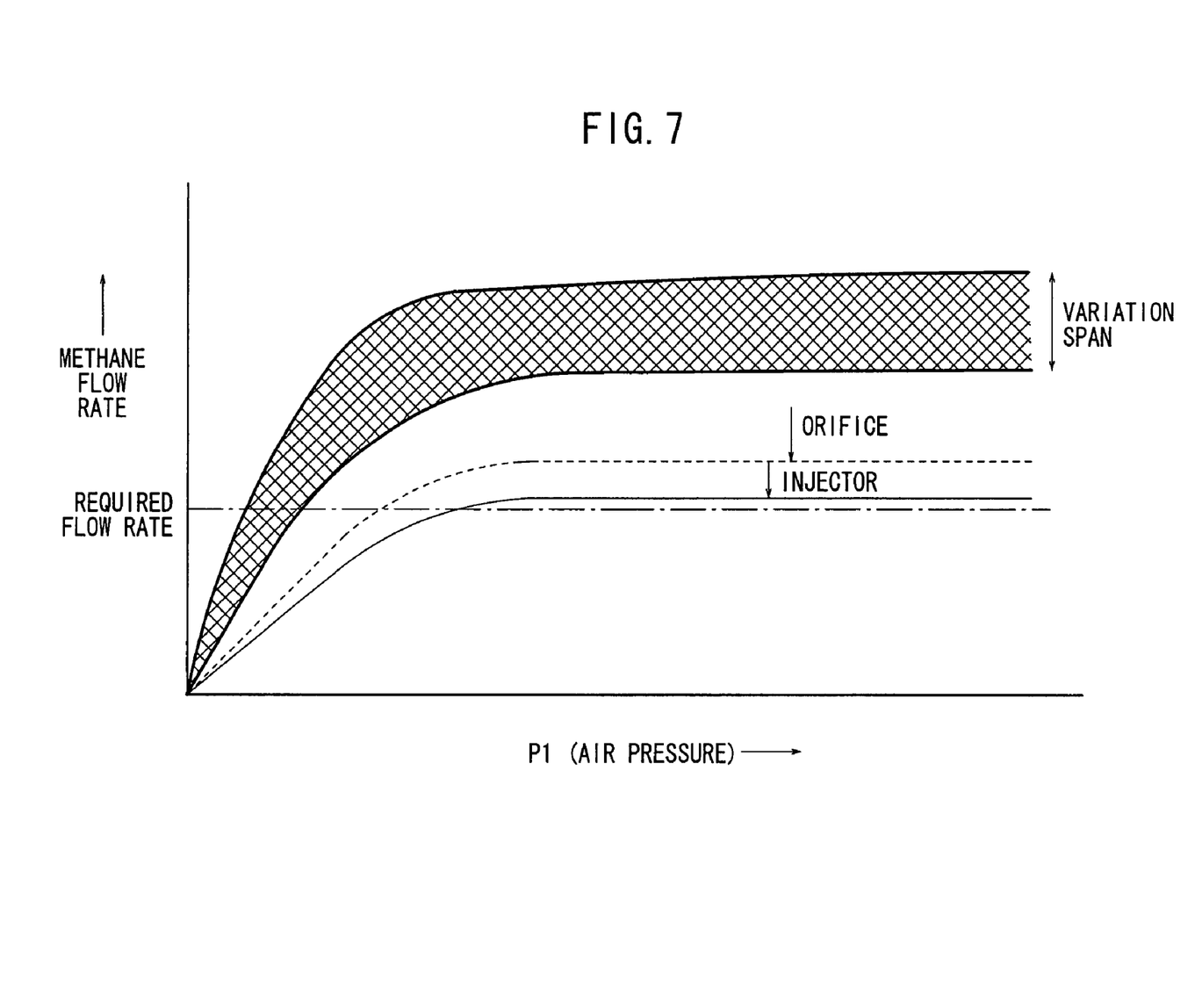
FIG. 7 is a diagram illustrative of a flow rate of a modifying fuel with a combination of a modifying-fuel ejector, an injector, and an orifice.

According to the fourth embodiment, the orifice 96 operates to reduce the flow rate of the modification fuel that is drawn by the modification fuel ejector 40 to a level close to a required flow rate, and the coil energization time of the injector 86 is controlled to prevent the flow rate of the modification fuel that is drawn by the modification fuel ejector 40 from varying (see FIG. 7). The flow rate of the modification fuel can thus be adjusted highly accurately to a desired flow rate level, and reliably stabilized.

In the second through fourth embodiments, a feedback signal used in the control process performed by the control ECU 74 is supplied from the pressure meter 45 connected to the modifying-air supply passage 32. However, such a feedback signal may be supplied from a pressure meter (not shown) that is disposed downstream of the injector 86 or the orifice 96 in the hydrogen-containing fuel supply passage 43.

Although certain preferred embodiments of the present invention have been shown and described in detail, it should be understood that various changes and modifications may be made therein without departing from the scope of the appended claims.

What is claimed is:

1. An apparatus for manufacturing a fuel gas, comprising:
   a modifier for modifying a hydrogen-containing fuel to produce a modified gas;
   said modifier comprising:
      a modifying unit for modifying the hydrogen-containing fuel;
      a hydrogen-containing fuel supply mechanism for supplying said hydrogen-containing fuel, wherein said hydrogen-containing fuel supply mechanism has an injector, separate and distinct from a valve;
      an ejector for drawing the hydrogen-containing fuel from the hydrogen-containing fuel supply mechanism; and
      modifying air supply means for supplying modifying air and for setting the pressure of the modifying air delivered to the ejector such that the hydrogen-containing fuel is kept at a required flow rate independent of pressure fluctuations downstream of the ejector,
   wherein the ejector mixes said hydrogen-containing fuel drawn from said hydrogen-containing fuel supply mechanism and said modifying air delivered from said modifying air supply mechanism into a mixture, and supplies the mixture to said modifying unit,
   wherein the ejector draws the hydrogen-containing fuel from the hydrogen-containing fuel supply mechanism based upon a pressure at which the modifying air is delivered from the modifying air supply mechanism, and
   wherein the injector is disposed upstream of the ejector.

2. An apparatus according to claim 1, wherein said ejector has:
   a main passageway for ejecting the modifying air from a nozzle; and
   an auxiliary passageway for drawing said hydrogen-containing fuel with the modifying air ejected by said main passageway.

3. An apparatus according to claim 2, wherein said modifier has a valve connected to said main passageway for regulating the pressure of said modifying air supplied to said ejector.

4. An apparatus according to claim 1, wherein said modifier has a pressure meter disposed upstream of said ejector for detecting the pressure of said modifying air.

5. An apparatus according to claim 1, wherein said hydrogen-containing fuel supply mechanism has an orifice disposed upstream of said ejector.

6. An apparatus according to claim 1, wherein said hydrogen-containing fuel supply mechanism has an injector and an orifice which are disposed parallel to each other upstream of said ejector.

* * * * *